(No Model.) 2 Sheets—Sheet 2.
L. PFINGST & S. A. BEMIS.
CAR BRAKE.
No. 431,075. Patented July 1, 1890.
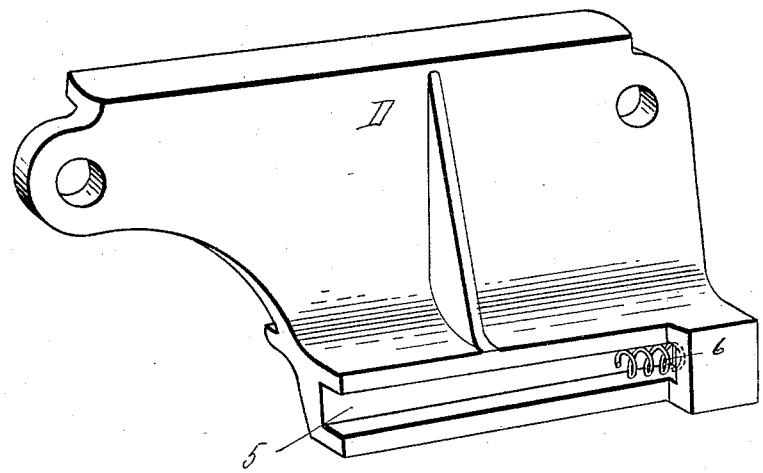
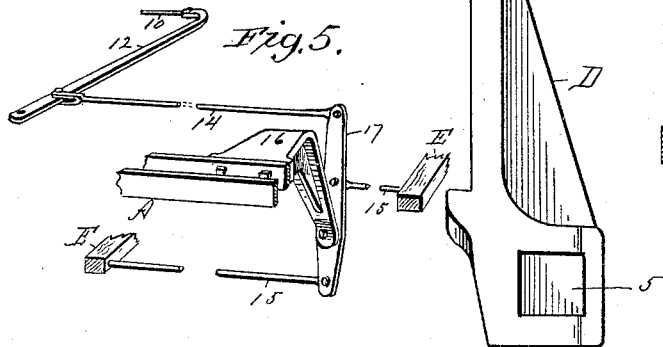
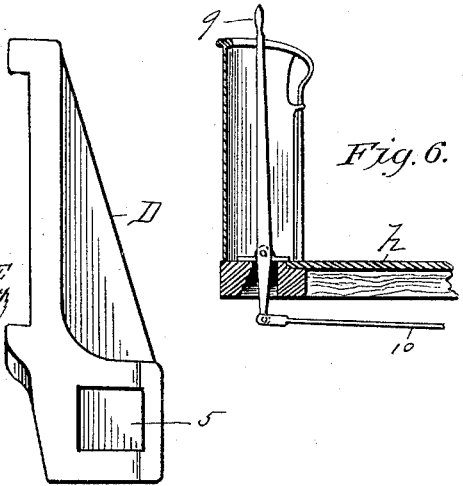

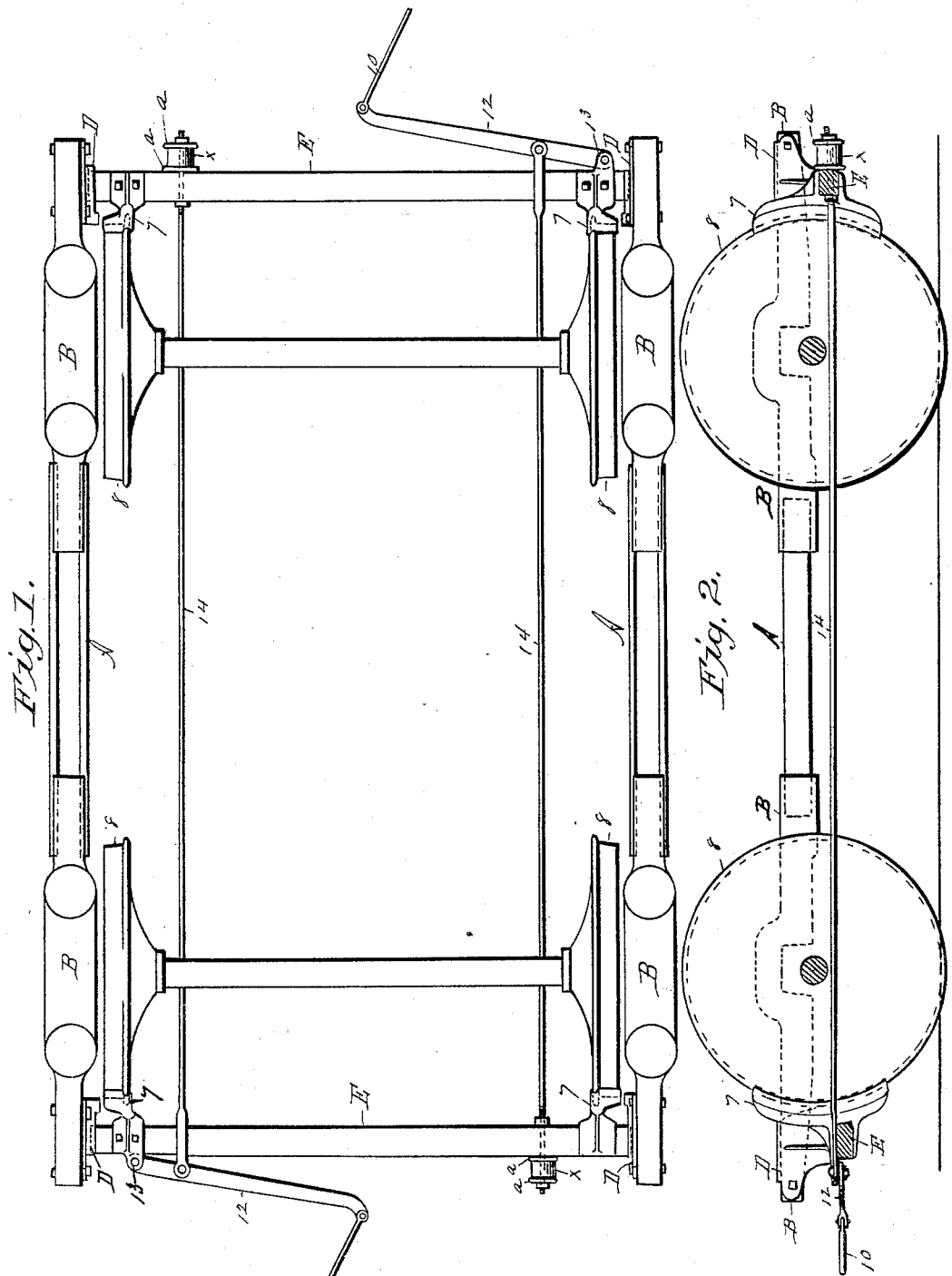

UNITED STATES PATENT OFFICE.

LOUIS PFINGST, OF BOSTON, AND SUMNER A. BEMIS, OF SPRINGFIELD, MASSACHUSETTS.

CAR-BRAKE.

SPECIFICATION forming part of Letters Patent No. 431,075, dated July 1, 1890.

Application filed September 2, 1889. Serial No. 322,787. (No model.)

*To all whom it may concern:*

Be it known that we, LOUIS PFINGST, of Boston, county of Suffolk, State of Massachusetts, and SUMNER A. BEMIS, of Springfield, county of Hampden, State aforesaid, citizens of the United States, have invented new and useful Improvements in Brake Devices for Electric-Car Trucks, of which the following is a specification.

This invention relates to electric-railway car-trucks, the object being to provide improved brake devices for the trucks of the above-mentioned description of cars whereby the space between the axles of said trucks which is required for the electric motor or motors is not encumbered inconveniently with any of the brake-operating mechanism; and the invention consists in the construction and the means of hanging and operating said brake devices, all as hereinafter fully described, and pointed out in the claims.

In the drawings forming part of this specification, Figure 1 is a plan view, and Fig. 2 a longitudinal section, of a car-truck provided with brake mechanism embodying our improvements. Fig. 3 is a perspective view, and Fig. 4 an end elevation, of one of the brake-beam hangers. Fig. 5 illustrates a modified construction of the brake-operating mechanism, which is hereinafter fully described. Fig. 6 is a sectional view of a portion of a platform of a car to which said improvements are applied, in which is shown in side elevation a brake-lever and a portion of the brake-rod connected thereto.

In the drawings, A indicates the side bars of the truck between the axles thereof, and B the yokes which extend over the axle-boxes of the truck, (said boxes not being shown in the drawings,) said yokes being secured on the opposite ends of said side bars, and the outer ends of said yokes extend far enough beyond the wheels of the truck at each end of the latter to admit of attaching hangers D thereto, which serve as supports for a brake beam or support E at each end of the truck-frame outside of the wheels. One of said brake-beam hangers is illustrated in perspective view in Fig. 3 and in end elevation in Fig. 4, and said hanger is provided with a longitudinal groove 5 near its lower edge, which, when the hanger is on the truck-frame, receives one end of said brake-beam, and at the rear end of said groove 5 is placed a spring 6—either of coiled metal, as shown, or of rubber or other suitable material—having sufficient reactive power to move each end of the brake-beam in a direction from the wheels of the truck when the brake-beam shall have been made free to so move by releasing or disconnecting the brake-lever, thereby positively effecting the disengagement of the brake-shoes 7 from the wheels 8. The said brake-shoes are of the usual form and material, and are rigidly bolted to said brake-beams.

From the illustration of the construction of the aforesaid brake-beam hangers and the description thereof it will be clearly understood that each of the brake-beams is firmly supported by two of said hangers at the end of the car-truck, the groove 5 of the hangers receiving the ends of said beam, and so supporting the latter that it is permitted to have the free movement therein toward and from the truck-wheels which is requisite to the proper operation thereof. It will be seen that the said brake-beam hangers constitute the sole means of support for the brake-beam, and their construction of suitable metal and their rigid attachment by bolts to the inner sides of said yokes B provides a brake construction of great strength and durability.

The brake-beams E have their ends so fitted to engage with the grooves 5 of the brake-beam hangers as to permit each end of each brake-beam to swing within the hanger-groove toward and from one of the truck-wheels, while the opposite end of said beam remains substantially stationary, the brake-beams being so disposed and arranged, instead of adapting them to be moved bodily toward and from both wheels of the axle, in order to provide an arrangement of brake-operating levers, as below described, whereby the brakes shall be applied to the wheels on one side of the truck only, from one end of the car or truck, and to the wheels of the opposite side of the truck by a brake-lever at the opposite end of the latter or the car. This construction and arrangement of the brakes, which are particularly adapted for operation by a brakeman on cars of the above-mentioned description, facilitates a quicker and more effective operation of the brakes than can be produced by means of the ordinary winding or rotating brake-shaft; and, furthermore, the said arrangement of the brake-beams between the wheels and ends of the car leaves the space between the axles clear for an electric motor or motors. A simultaneous movement of the ends of the brake-beams against the wheels 8 at one side of the car-truck is effected by means of a brake-lever 9, pivoted on the platform $h$ of the car, or one acting similarly to move the rod 10, (see Fig. 6,) which has its lower end connected by said rod with a lever 12, which has one end thereof pivotally attached to a hanger 13 on or near the end of the brake-beam, said lever 12 being connected with one end of the brake-beam at the opposite end of the truck by a brake-rod 14, the end of said rod 14, which is attached to the latter-named end of the brake-beam, being provided at the outer side of the latter with two metal washers $a\ a$, between which is placed a rubber spring $x$, which is slightly compressed when the power is applied to force the brakes against the truck-wheels.

A brake-lever is placed at each end of the car, and by means of the same the brakes on either side of the latter are brought against the wheels of one side by the simple motion of the free end of said brake-lever in one direction, and the brakes are let off by a similar motion of the lever in the opposite direction.

Fig. 5 illustrates a modified means of lever-connection, in a general way, between the brake-beams E of one side of the car-truck, which consists in attaching a hanger 16 to the inner side of the side bar A and pivoting to the end thereof a lever 17, which lever is connected to the ends of the brake-beams by the rod 15 and to said lever 12 by the rod 14. This means of connection may be adopted in place of that shown in Fig. 1, if desired.

While, as above set forth, the within-described arrangement of brake devices facilitates the attachment of motors to electric-car trucks, it is obvious that their use is in no way confined to this description of trucks; but they may be used with advantage on any other car-trucks as well.

What we claim as our invention is—

1. In a four-wheeled truck, the combination, with a pair of suitably-supported transverse brake-beams having brake-shoes thereon, of a pair of brake-levers, one at each end of the truck and each pivotally connected at opposite sides of the truck to or near the ends of their respective brake-beams, and a connection attached to the brake-lever for each brake-beam and extended to and having in substance an engagement with the other brake-beam.

2. In a truck, a pair of brake-shoes at each side thereof opposite the wheels, a brake-beam supporting two shoes at each end of the truck, and a lever connected directly to the brake-shoe support at one side and by a rod connected to the brake-beam at the other end of the truck, the specified parts combined substantially as described.

3. In a truck, a pair of brake-shoes at each side thereof opposite the wheel-treads, a brake-beam at each end of the truck supporting the shoes at that end, and a brake-lever at each end connected directly to the brake-shoe and by a rod connected to the brake-beam at the other end of the truck, said levers being at diagonally-opposite sides of the truck, all in combination, substantially as described.

4. Hangers for the brake-beams of a car-truck attached to the inner opposite sides of the truck-frame, each having a groove therein to receive one end of said beams, combined with brake-beams engaging in the grooves of said hangers, a brake-lever attached to each end of the car, and intermediate levers and brake-rod connections, substantially as described, between said brake-levers and the ends of said beams, substantially as set forth.

5. Hangers for the brake-beams of a car-truck attached to the inner opposite sides of the truck-frame, each having a groove therein to receive one end of said beams, and a spring at the inner end of said groove, combined with brake-beams engaging in the grooves of said hangers, a brake-lever attached to each end of the car, and intermediate levers and brake-rod connections, substantially as described, between said brake-levers and the ends of said beams, substantially as set forth.

6. Brake devices for cars, consisting of two brake-beam hangers attached to the inner opposite sides of the car-truck, each having a groove therein to receive the end of said beam, combined with a brake-beam engaging in the grooves of said hangers, either end of which is movable therein independently of the opposite end of the beam toward and from the car-wheels of one side only of the truck, substantially as set forth.

7. Brake devices for car-trucks, consisting of the hangers D, attached to the inner opposite sides of the truck-frame, each having a groove therein to receive one end of said beams, combined with two brake-beams having a sliding motion in said hanger-grooves, a lever 12, pivotally connected to each of said beams at opposite sides of the truck, a rod 14, connecting each of said levers 12 with one end of a beam at the opposite end of the truck, and a brake-lever connected with each of said levers 12, substantially as set forth.

8. The combination of a truck-frame, the grooved hangers thereon, and the brake-bars resting in the grooves of said hangers opposite each pair of wheels, the springs engaging said bars, and the operating-levers connected to said brake-bars, substantially as described.

LOUIS PFINGST.
SUMNER A. BEMIS.

Witnesses:
O. M. SHAW,
J. D. MATTHEWS,
H. A. CHAPIN,
G. M. CHAMBERLAIN.